United States Patent

[11] 3,615,179

| [72] | Inventors | David S. Rosenberg<br>Niagara Falls;<br>Alfred O. Minklei, Grand Island; Walter<br>M. Zimberg, Tonawanda, all of N.Y. |
|---|---|---|
| [21] | Appl. No. | 875,552 |
| [22] | Filed | Nov. 10, 1969 |
| [45] | Patented | Oct. 26, 1971 |
| [73] | Assignee | Hooker Chemical Corporation<br>Niagara Falls, N.Y. |

[54] PREPARATION OF MAGNESIUM PERCHLORATE
10 Claims, No Drawings

[52] U.S. Cl. ..................................................... 23/85
[51] Int. Cl. ..................................................... C01b 7/00
[50] Field of Search .......................................... 23/85

[56]          References Cited
           OTHER REFERENCES

Schumacher, Perchlorates, Their Properties Manufacture and Uses, ACS Monograph Series No. 146, 1960, p. 22, QD/181/C553

*Primary Examiner*—Leland A. Sebastian
*Assistant Examiner*—R. L. Tate
*Attorneys*—Peter F. Casella, Donald C. Studley, Richard P. Mueller, James F. Mudd and Richard K. Jackson ABSTRACT: Magnesium perchlorate of very high purity is prepared by the reaction of magnesium metal with water in the presence of an activating amount of perchloric acid to form $MgO(H_2O)_x$ in aqueous suspension. Concentrated perchloric acid is gradually added to the suspension of $MgO(H_2O)_x$ while vigorously agitating the mixture to produce magnesium perchlorate. The product is useful as an electrolyte in storage batteries.

PREPARATION OF MAGNESIUM PERCHLORATE

BACKGROUND OF THE INVENTION

This invention relates to a process for making magnesium perchlorate. In its more specific embodiment, this invention relates to the preparation of aqueous solutions of high-purity magnesium perchlorate.

Various processes are described in the literature for making magnesium perchlorate. The direct action of perchloric acid with magnesium metal has been employed in small-scale laboratory preparations. Since this reaction is highly exothermic and involves the evolution of large quantities of hydrogen gas in contact with perchloric acid, it is not suited to commercial synthesis. Magnesium perchlorate has been made commercially by the reaction of perchloric acid with magnesium carbonate or magnesium oxide obtained from natural sources. These materials contain impurities such as iron and other heavy metals, chlorides and sulfates which cannot be eliminated by normal purification techniques, such as recrystallization. Similarly, magnesium perchlorate can be made by metathesis of magnesium salts with salts of perchloric acid, such as ammonium perchlorate. In such processes, impurities are introduced by both reactants, and the difficulties of purification are compounded further.

One technique for producing magnesium perchlorate is via the reaction of magnesium carbonate with perchloric acid. By this technique, concentrated perchloric acid is added to an excess of magnesium carbonate in a sufficient amount of water to dissolve the final product. The reaction mixture is stirred during the addition of concentrated perchloric acid to assist in the removal of carbon dioxide generated. The reaction is not carried to completion, a small amount of magnesium carbonate being allowed to remain in the reaction mixture at the completion of the process to assist in the precipitation of iron. The product is filtered to remove excess magnesium carbonate and any hydrated iron oxide present.

The resulting product may be dehydrated to form anhydrous magnesium perchlorate which contains 0.01 percent insoluble material, 0.01 percent chloride, 0.005 percent sulfate, 0.001 percent iron, 0.001 percent heavy metals, 0.05 percent potassium, less than 8 percent water, and presents a pH of between 5.0–8.0 in a 5 percent solution.

SUMMARY OF THE INVENTION

The purpose of this invention is to provide a safe and commercially useful method for making aqueous solutions of magnesium perchlorate from magnesium metal and perchloric acid. This procedure provides precise control of reaction conditions so that secondary and uncontrolled reactions which may form undesirable byproducts are avoided. In general, the method of this invention involves the preparation of a highly dispersed aqueous slurry of hydrated magnesium oxide by reaction of particles of magnesium metal with water in the presence of an activating quantity of perchloric acid, followed by the subsequent addition of perchloric acid at a controlled rate to form an aqueous solution of magnesium perchlorate.

Therefore, in accordance with this invention, it has been found that an aqueous solution of magnesium perchlorate may be produced in a highly pure state by the reaction of magnesium metal with water in the presence of an activating amount of perchloric acid to form a reaction mixture and subsequently introducing concentrated perchloric acid gradually into said reaction mixture to produce the desired product.

DETAILED DESCRIPTION OF THE INVENTION

An aqueous solution of magnesium perchlorate may be produced in a highly pure form by the reaction of magnesium metal with excess water in the presence of a small amount of $HClO_4$ as an initiator, followed by the addition of concentrated perchloric acid to the reaction mixture.

It is most desirable to avoid contamination of the reaction system by employing magnesium metal of the highest purity. For example, magnesium metal of 99.8 percent magnesium is a desirable state of purity for the initial reactant and preferably, magnesium metal of 99.95 percent magnesium is employed.

In the production of a very pure aqueous solution of magnesium perchlorate, the introduction of contaminants with the reactants is a key problem. Although distilled or deionized water may be employed as the initial reactant, conventional city water is often of sufficient purity to result in an acceptable purity of magnesium perchlorate.

The amount of water employed in the reaction of magnesium metal with water is in excess of the stoichiometric amount required for the production of a hydrous magnesium oxide. The amount of water employed is that amount needed to obtain a final product solution containing the desired concentration of magnesium perchlorate, and is limited only by the solubility of the magnesium perchlorate hexahydrate. If the magnesium perchlorate is to be employed subsequently as an aqueous solution, the amount of water can be adjusted to provide this preferred concentration without the further necessity of concentrating or diluting the reaction mixture. In a typical commercial form, the concentration of the final solution of magnesium perchlorate is selected as that concentration which is clear upon visual inspection at 0° F. To produce a concentrated, clear solution of magnesium perchlorate at 0° F. the amount of water selected or employed during the reaction may be chosen to produce a magnesium perchlorate solution which contains up to 68.4 percent and preferably about 66.8 percent magnesium perchlorate calculated as the hexahydrate. The concentrated solution of magnesium perchlorate is most desirable because of shipping, handling and containerizing economics.

The reaction of magnesium metal with water is slow and unpredictable. An adherent coating of mixed reaction products such as magnesium oxide, hydrated magnesium oxide and magnesium hydroxide forms on the metal surfaces. The composition and form of these deposits depends on local reaction conditions and the temperature of the reaction.

In order to obtain a controlled and reproducible reaction of magnesium metal with water, it is necessary to supply an agent which will initiate and promote the reaction. It is also desirable that this reaction should proceed in such a way as to provide a reaction product of the magnesium metal with water in a form that be easily converted to magnesium perchlorate by subsequent reaction with perchloric acid. It is further desirable that this additive should not contaminate the final product. We have now found that all of these requirements can be met by addition of a controlled amount of perchloric acid to an aqueous slurry of magnesium metal particles. An amount of perchloric acid from about 0.05 percent to about 30 percent of that stoichiometrically required for the entire reaction may be used to initiate and promote the reaction of magnesium with water. However, it has been found that an especially preferred quantity of perchloric acid is from 0.1 to 0.7 percent of that amount needed to convert all of the magnesium metal to magnesium perchlorate.

By varying the amount of perchloric acid introduced into the mixture of water and magnesium metal, the consistency of the hydrous magnesium oxide intermediate produced may be controlled. It is most desirable to produce the hydrous magnesium oxide product in the least viscous form. An amount of perchloric acid from about 0.1 percent up to approximately 0.7 percent of the stoichiometric amount required for the complete reaction may be added to the mixture of water and magnesium metal to afford a hydrous magnesium oxide product which is a grainy slurry. With additions of perchloric acid initiators from about 0.7 percent to 5 percent, a product is obtained which is the most viscous (actually thixotropic) hydrous magnesium oxide. It is desirable and very advantageous to control the viscosity of the hydrous magnesium oxide product so that during the reaction with concentrated perchloric acid the product will rapidly pass through the most viscous phase. The more perchloric acid added to the magnesium metal and water, the faster the reaction rate and the more rapid temperature rise in the initial stages of the reaction.

It has been found to be most desirable to introduce the magnesium metal into water at room temperature and a pH above 7 so that no reaction occurs between the magnesium metal and water until desired. The reactor is then exhausted of oxygen and carbon dioxide by sweeping the reactor with an inert gas such as nitrogen or argon. Subsequently the reaction between magnesium and water is initiated by the addition of a small amount of perchloric acid.

The reaction of magnesium metal with water is very exothermic, with approximately two-thirds of the overall heat of reaction liberated in this stage. This reaction of magnesium metal with water is most effectively carried out at the normal boiling point of water, removing the heat evolved by evaporation of water. The water vapor thus formed can be condensed and returned to the reactor or the equivalent fresh water can be supplied to the vessel. By thus effecting the reaction under isothermal conditions a smooth and well controlled reaction is obtained. If all of the water is allowed to boil out of the reaction mixture of magnesium of metal and water, the reaction becomes dry and merely ceases since water is one of the reactants. In any event, the reaction is conducted at a temperature from about room temperature to the reflux temperature of the system. External cooling may be employed to control the reaction temperature if desired.

To the suspension of hydrous magnesium oxide is gradually added a concentrated perchloric acid solution. The concentration of the perchloric acid used is not critical and may most conveniently be that of the standard commercial product containing 60–72 percent by weight of perchloric acid. About one-third of the overall heat of reaction is evolved during the reaction of hydrous magnesium oxide with perchloric acid. The reaction medium is agitated to assure a uniform mixture and to provide removal of the heat of reaction through the walls of the vessel. The temperature is kept preferably below the boiling point of the mixture and is controlled by the rate of addition of the perchloric acid.

A stoichiometric amount of concentrated perchloric acid is added to the solution of magnesium hydroxide or hydrous magnesium oxide. At the conclusion of the addition of the stoichiometric amount of perchloric acid, a slight excess is added to afford a reaction product on the acid side of pH 7. To the acid reaction product, is added a reagent which will adjust the pH to near neutrality.

Magnesium carbonate has been found to be an ideal reagent to add to the magnesium perchlorate solution. The amount required is too small to introduce objectionable contaminants. It reacts with residual perchloric acid to produce magnesium perchlorate, giving a neutral product. An excess over that needed to neutralize the perchloric acid is used, providing a readily filterable solid adsorbent which removes residual heavy metal salts from the solution.

The product is filtered to remove any precipitated impurities to afford an aqueous solution of magnesium perchlorate containing less than 0.2 parts per million iron and generally less than 0.1 parts per million iron; less than 10 parts per million calcium; 0.004 percent chloride ions; less than 0.002 percent chlorate ions; less than 5 parts per million heavy metals such as silver, lead, mercury, bismuth, cadmium, copper, tin, antimony and arsenic; less than 0.001 percent sulfate ions with a very faint trace of insoluble material estimated by visual observation to be less than 0.001 percent.

Magnesium perchlorate, in aqueous solution, finds utility in the production of long-life batteries of the magnesium type for use or storage in hot, humid locations where the magnesium batteries excel in storage stability. Generally, such magnesium batteries are primary cells in which the casing is made of magnesium and the electrolyte is formulated from a mixture of carbon, manganese dioxide, barium chromate, and magnesium hydroxide, which is wetted with magnesium perchlorate to form a paste which is hydraulically cast in a mold and wedged into the casing with subsequent insertion of a carbon electrode in the center of the battery. These primary cells find utility as power sources for radios, etc. For use in the production of a magnesium battery, slightly impure magnesium perchlorate shortens the life of the battery. Very impure magnesium perchlorate renders the battery inoperable. Hence, the development of a very highly pure aqueous magnesium perchlorate solution is a very significant contribution to the art. In practice, a concentrated magnesium perchlorate solution is diluted to a concentration of approximately 5 percent for ultimate use as a battery electrolyte.

EXAMPLE I

Into a round bottom flask equipped with a reflux condenser and an agitator and placed in a water bath, was introduced 51.53 grams (2.11 moles) of magnesium turnings. The vessel was continuously purged with a stream of oil free nitrogen. To the magnesium turnings was added 381 grams (21.16 moles) distilled water. To the mixture in the reactor was added about 50 milliliters of perchloric acid slowly. The temperature of the reaction mixture began to rise as the reaction started. A vigorous reaction proceeded with the production of magnesium hydroxide (hydrous magnesium oxide). The temperature of the reactor maintained itself between 85–90° C. In approximately 45 minutes, the reaction mixture had become very viscous. Subsequently the remainder of the perchloric acid (density about 1.65) was slowly introduced into the reactor (total $HClO_4$ 71 percent was 576.0 grams —4.07 moles actual). The temperature of the reaction mixture was raised to 90° C. to insure complete reaction of the magnesium metal. At the conclusion of the reaction a few small pieces of magnesium remained in the reactor. 10 grams of magnesium carbonate was added and the mixture was stirred at 90° C. for about 10 minutes. The reaction mixture was then filtered to obtain 878.2 grams of product containing approximately 24 parts per million $Cl^1$ ion.

EXAMPLE II

The procedure of example 1 was repeated except that about 25 milliliters of perchloric acid was introduced into the magnesium metal-water mixture at a temperature of 25° C. The reaction started vigorously and was self sustaining for approximately 37 minutes at which time the addition of concentrated perchloric acid was begun. The addition of perchloric acid was continued over a period of 18 minutes. No cooling was necessary. At the completion of the reaction 10 grams of magnesium carbonate were added to the reaction mixture and the mixture was continuously agitated and held at a temperature of about 90° C. for a period of about an hour at which time, the reaction mixture was filtered to yield an aqueous solution containing 929.2 grams of magnesium perchlorate. The reaction product contained abut 18.3 parts per million chloride ion.

EXAMPLE III

The following example demonstrates the application of the instant invention in various process runs in which 101.4 grams of magnesium turnings of both 99.8 and 99.95 percent pure magnesium were employed. A stoichiometric amount of concentrated (70–72 percent) perchloric acid was employed with a slight excess of perchloric acid added after the overall reaction had subsided. The amount of water employed was in excess of that required to react with magnesium turnings to afford a magnesium perchlorate solution containing up to 68.4 percent magnesium perchlorate calculated as the hexahydrate. At concentrations above 68.4 percent hexahydrate, the aqueous solution was turbid rather than clear.

| Run | Time, minutes | | | Temperature, °C. | | | | MgCO₃ added percent [1] | pH 5% sol'n. | Analysis | | | | | | | Clarity, 0° F. |
|---|---|---|---|---|---|---|---|---|---|---|---|---|---|---|---|---|---|
| | MgO(H₂O)ₓ prep. | HClO₄ add'n. | MgCO₃ neut. | Max. | Avg. | MgCO₃ neut. | | | | Fe (p.p.m.) | Ca (p.p.m.) | Cl⁻ (percent) | ClO₃⁻ (percent) | Heavy metals (p.p.m.)[2] | SO₄⁻ percent | Insol. matter, percent | Mg(ClO₄)₂ 6H₂O, percent |
| 1 | 1,010 | 82 | 75 | 50 | 15-50 | 25-30 | 10 | 7.9 | 0.1 | 8 | 0.004 | <0.002 | <5 | 0.001 | Trace[3] | 68.4 | Clear. |
| 2 | 1,000 | 90 | 55 | 40 | 30-35 | 12-25 | 5 | 7.3 | 0.1 | 10 | 0.004 | <0.002 | <5 | <0.001 | do | 69.2 | Turbid. |
| 3 | 0 | 80 | 60 | 74.5 | 45-60 | 40 | 5 | 7.7 | 0.1 | 8 | 0.004 | <0.002 | <5 | Nil | Nil | 68.4 | Clear. |
| 4 | 2 | 55 | 45 | 100 | 90-100 | 35 | 5 | 7.3 | 0.1 | 9 | 0.004 | <0.002 | <5 | do | Trace[3] | 67.8 | Do. |
| 5 | 183 | 30 | 30 | 94.5 | 56-94 | 34 | 5 | 7.3 | 0.2 | 10 | 0.004 | <0.002 | <5 | do | do | | Do. |
| 6 | 2 | 34 | 62 | 113 | 100-113 | 54-83 | 5 | 8.1 | 0.2 | 9 | 0.004 | <0.002 | <5 | <0.001 | do | | Do. |
| 7 | 66 | 86 | 64 | 71 | 43-71 | 11-13 | 5 | | | | | | | | | | |

[1] Based on the stoichiometric MgCO₃ required for the complete reaction of the HClO₄.
[2] Heavy metals include Ag, Pb, Hg, Bi, Cd, Cu, Sn, Sb and As. Obtained by precipitating with H₂S in acid medium.
[3] Estimate—approx. <0.001%—by visual observation.

What is claimed is:

1. A process which comprises
  a. combining in a reactor magnesium metal, water and perchloric acid in an activating amount from about 0.001 to about 0.6 gram moles of HClO₄ per gram atomic weight of Mg.
  b. maintaining the temperature of the combination at from about room temperature to about the boiling point at ambient pressure, to produce an aqueous reaction mixture slurry of hydrous magnesium oxide;
  c. gradually adding concentrated perchloric acid to said slurry in an amount required to convert said hydrous magnesium oxide to magnesium perchlorate.

2. The process of claim 1 in which the magnesium metal is introduced into water at a pH above about 7, the reactor is purged with an inert gas, and the activating amount of perchloric acid is subsequently introduced into the reactor.

3. The process of claim 1 in which the reaction of magnesium metal with water is conducted under reflux conditions in the presence of an inert atmosphere.

4. The process of claim 1 in which the water with which magnesium metal is reacted is deionized water.

5. The process of claim 1 in which the reaction of magnesium with water is promoted by the addition of from about 0.002 to about 0.014 gram moles of HClO₄ per gram atomic weight of Mg.

6. The process of claim 1 in which said reaction mixture is a viscous thixotropic suspension of hydrous magnesium oxide.

7. The process of claim 1 in which said reaction mixture is vigorously agitated during the addition of concentrated perchloric acid.

8. The process of claim 1 in which a slight excess of concentrated perchloric acid is added to said reaction mixture to obtain an acidic product which is subsequently neutralized and filtered to afford an aqueous solution of magnesium perchlorate.

9. The process of claim 1 in which the rate of addition of concentrated perchloric acid to said reaction mixture is regulated to control the temperature of the reaction medium.

10. The process of claim 1 in which the magnesium metal reactant is above 99.8 percent magnesium.